(12) United States Patent
Brown et al.

(10) Patent No.: US 7,039,580 B1
(45) Date of Patent: May 2, 2006

(54) METHOD, SYSTEM, ARTICLE OF MANUFACTURE, AND PROPAGATED SIGNAL FOR ELECTRONICALLY ORDERING PHOTOGRAPHIC PRINTS AND GIFTS FROM PHOTOS

(75) Inventors: Kenneth Brown, San Jose, CA (US); Parijat A. Chitale, Sunnyvale, CA (US); Joe Matthew Pequignot, San Francisco, CA (US)

(73) Assignee: Fuji Film Software (California), Inc., Sunnyvale, CA (US)

( * ) Notice: Subject to any disclaimer, the term of this patent is extended or adjusted under 35 U.S.C. 154(b) by 668 days.

(21) Appl. No.: 09/372,750

(22) Filed: Aug. 11, 1999

(51) Int. Cl.
*G06F 17/60* (2006.01)

(52) U.S. Cl. .......................... 704/26; 705/709; 705/23
(58) Field of Classification Search .................. 705/26, 705/27, 40
See application file for complete search history.

(56) References Cited

U.S. PATENT DOCUMENTS

| 5,477,353 A |   | 12/1995 | Yamasaki |
| 5,974,401 A | * | 10/1999 | Enomoto et al. ............. 705/40 |
| 6,017,157 A | * | 1/2000 | Garfinkle et al. ........... 396/639 |

\* cited by examiner

*Primary Examiner*—Wynn W. Coggins
*Assistant Examiner*—Jaime E. Zurita
(74) *Attorney, Agent, or Firm*—Birch, Stewart, Kolasch & Birch, LLP

(57) ABSTRACT

A method, system, article of manufacture, and propagated signal which provides an easy and flexible way for consumers to print digital photographs received and processed from a variety of different sources and a variety of different ways. Image information, which represents a photographic image, is received from several different sources, order information is received from an external network, the order is processed based on the digital image and the order information, and the photographic images are then output or uploaded in order to produce a photographic print or merchandise with an image printed thereon. The ordering of products is also improved by maintaining the images to be uploaded in a local memory until the order is complete.

38 Claims, 5 Drawing Sheets

METHOD, SYSTEM, ARTICLE OF MANUFACTURE, AND PROPAGATED SIGNAL FOR ELECTRONICALLY ORDERING PHOTOGRAPHIC PRINTS AND GIFTS FROM PHOTOS

BACKGROUND OF THE INVENTION

1. Field of the Invention

The present invention relates to a method, system, article of manufacture, and propagated signal which permits on-line electronic ordering of photographic prints and products with photographic images printed thereon.

2. Description of the Related Art

There are a number of on-line photo-services, for example, www.pix.com which provides photographic gift services offered by Eastman Kodak, which integrate consumer photographic software, such as Microsoft PictureIt?®.

A conventional on-line system 100 which provides these on-line photo-services is illustrated in FIG. 1. The system 100 of FIG. 1 includes a computer 110 for example, (a PC), a photofinishing lab 130, and a third party fulfillment house 140, which are connected to the computer 110 by the internet 120. The computer 110 which is operated by a consumer 1, includes an operating system, known to one of ordinary skill in the art, for example, Microsoft Windows 95 (or an upward compatible version) or Windows NT 4.0 (or an upward compatible version). The operating system includes a file system 112. The computer 110 also runs a photo editing application 114 (Microsoft PictureIt!® is one example), which is compatible with the operating system. Digital images which are stored in the file system 112 are edited by the consumer 1 using the computer photo editing application 114. The edited images are uploaded to a photofinishing lab 130 and/or the third party fulfillment house 140, via the internet 120. The photofinishing lab 130 produces high quality images which are delivered to the consumer 1, via means other than the internet 120 (mail, courier, etc.). The third party fulfillment house 140 produces items, such as mugs, T-shirts, etc., with the desired image printed thereon, and provides the desired goods to the consumer 1, also via the other means. The photofinishing lab 130 and the third party fulfillment house 140 also provide pricing and merchandise availability information to the consumer 1 at the computer 110, via the internet 120.

The above services, however, have a variety of drawbacks. In particular, users, have photographs in digital form on their desktop computers at home or work. However, the users cannot easily convert the digital photographs to high quality prints offered by consumer photofinishing services. In particular, in the Kodak system, an additional computer program (Microsoft PictureIt!®) is required in order to order high quality prints.

SUMMARY OF THE INVENTION

The present invention makes it easier to electronically transfer the photographs from the users' computer, available from a variety of different sources, to the service provider, order prints and photo gifts, and have the prints and gifts delivered to the user without the user ever leaving his home or office.

The present invention provides an easy and flexible way for consumers to print digital photographs received and processed from a variety of different sources in a variety of different ways. The present invention also increases the speed of the ordering process and the utilization of network resources by waiting until an order is complete before uploading the digital images.

DETAILED DESCRIPTION OF THE PREFERRED EMBODIMENT

Figure 1:
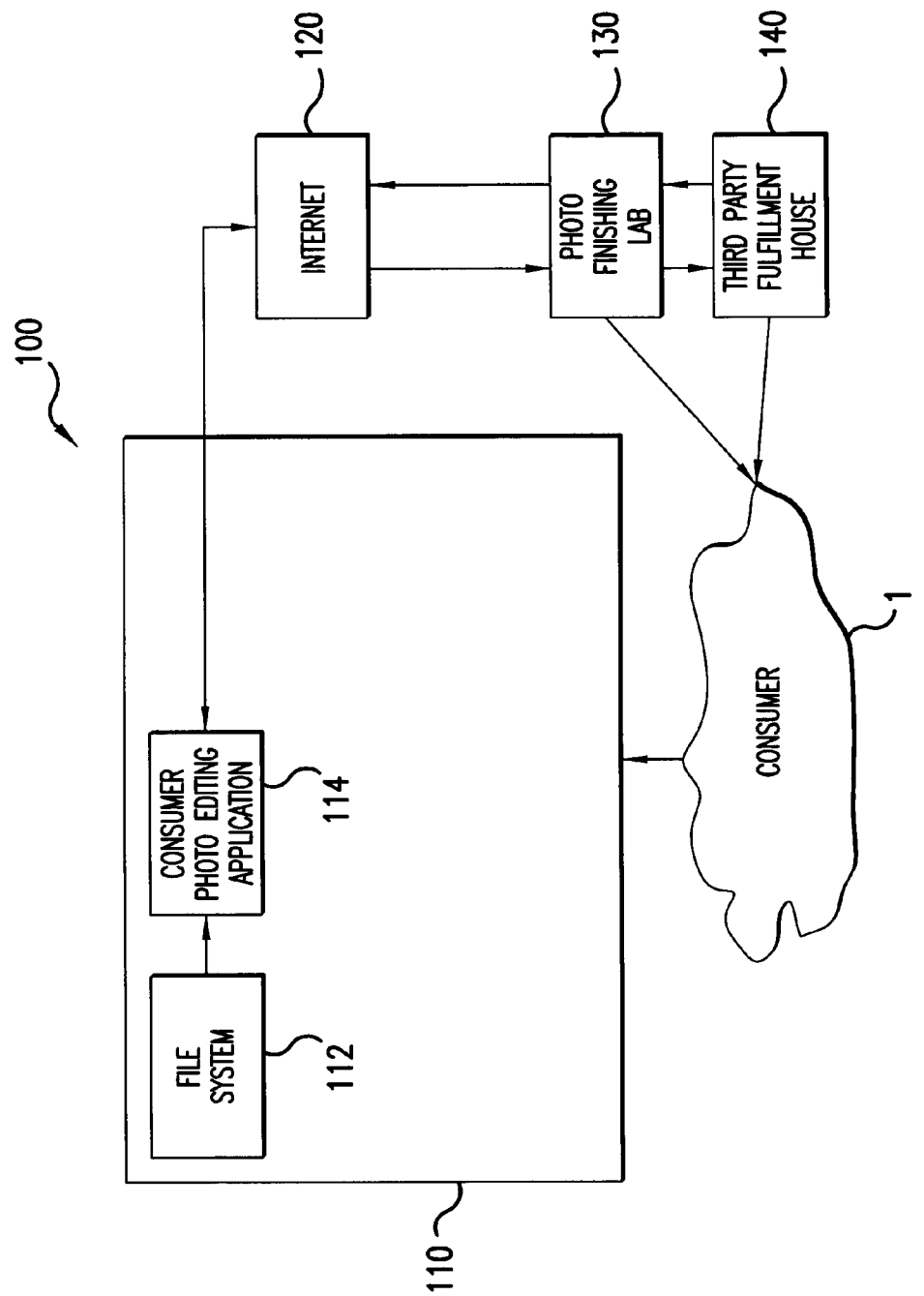
FIG. 1 illustrates a conventional on-line photo-service system.
Figure 2:
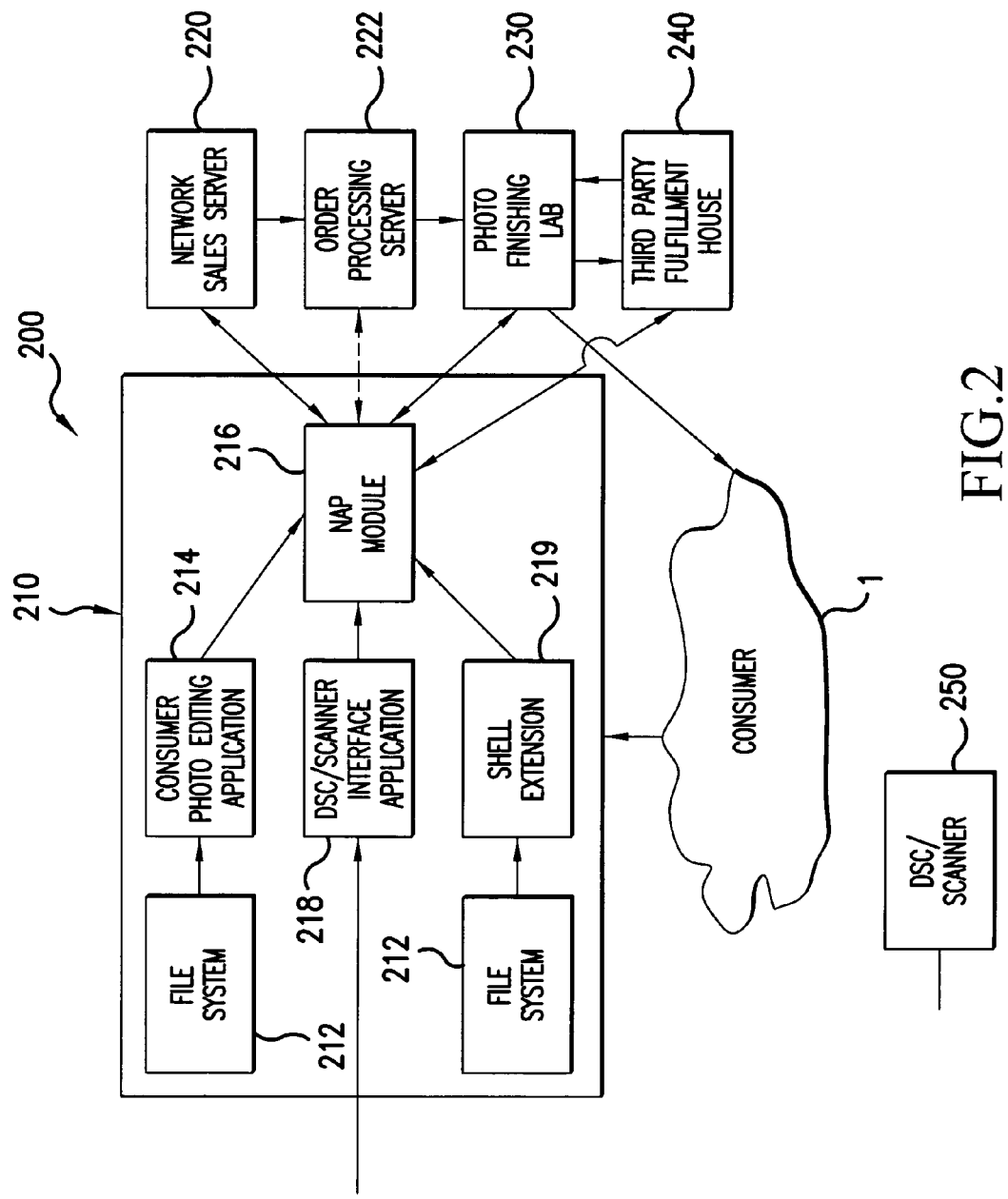
FIG. 2 illustrates one embodiment of a network photo print system of the present invention.

FIG. 2 illustrates a network photo print system 200 in one embodiment of the present invention. The system 200 of FIG. 2 includes a computer 210 (for example, a PC), a network sales server 220, an order processing server 222, a photofinishing lab 230, and a third party fulfillment house 240. The computer 210, which is operated by the consumer 1, includes an operating system, known to one of ordinary skill in the art, for example, Microsoft Windows 95 (or an upward compatible version) or Windows NT 4.0 (or an upward compatible version). The operating system includes a file system 212. The computer 210 also may run a photo editing application 215 (Microsoft PictureIt!® is one example), which is compatible with the operating system. Digital images which are stored in the file system 212 are edited by the consumer 1 using the computer photo editing application 214. The edited images are uploaded to the photofinishing lab 230 and/or the third party fulfillment house 240, via a Network Access Protocol (NAP) module 216, the network sales server 220 and the order processing server 222. The photofinishing lab 230 produces high quality images which are delivered to the consumer 1, via means other than the network sales server 220 and the order processing server 222 (mail, courier, etc.). The third party fulfillment house 240 also produces items such as mugs, T-shirts, etc., with the desired images printed thereon, and provides the desired goods to the consumer 1, also via other means. Similar to the conventional system, the photofinishing lab 230 and the third party fulfillment house 240 also provide pricing and merchandise availability information to the consumer 1, at the computer 210, via the network sales server 220 and the order processing server 222.

The NAP module 216, in addition to receiving digital images from the consumer photo editing application 214, also receives digital images from a digital still camera or scanner 250, via a DSC/scanner interface application 218. The NAP module 216 also receives digital images from the file system 212, via an operating system shell extension 219.

The network sales server 220 and the order processing server 222, facilitates the exchange of digital image and order information between the consumer 1 and the photofinishing lab 230 and third party fulfillment house 240, such that the consumer 1 can upload digital information (obtained by the computer 210 in a variety of ways as described above) stored on computer 210, and transfer the digital information to the photofinishing lab 230 and the third party fulfillment house 240, such that the consumer 1 can obtain high quality digital photographs and merchandise with the high quality digital photographs printed thereon. Although the functionality of the network sales server 220 and order processing server 222 are separately shown in FIG. 2, the functions of these two servers may be combined into a single server.

The system 200, and more particularly, the NAP module 216, illustrated in FIG. 2 provides an easy and flexible way for consumers to print digital photographs received and processed from a variety of different sources in a variety of different ways. As set forth above with respect to FIG. 2, the NAP module 216 transfers digital images stored in the file system 212 and edited by consumer photo editing application 214 to the photofinishing lab 230 and the third party fulfillment house 240, so that the consumer 1 can obtain the desired images and products. The NAP module 216 also transfers digital information received directly from a digital still camera/scanner, via a DSC/scanner interface application. The NAP module 216 also transfers digital images stored in the file system 212, using a shell extension 219 to the operating system. The shell extension 219 permits a technique for providing a PRINT option on a PROPERTIES menu, available through a right mouse button click on a file. The shell extension 219 thus extends the operating interface, such that an option appears for image file icons on the PROPERTY menu and/or the FILE menu, such that consumers can print their photos without having to invoke a separate application program.

The network print system 200 of FIG. 2 also provides a fast and easy way to display images on the network sales server during the order process. The network photo print system 200 provides an easy to use application that interfaces with digital still camera and scanners. The network photo print system 200 also provides complete integration with consumer photo editing applications 214, such as Microsoft PictureIt!®. Finally, the network photo print system 200 provides an easy ordering work flow which does not require an account on a network server 220 and does not require customers to store their photographs on the network server 220.

One of the goals of the network photo print system 200 of the present invention is to permit a consumer 1, operating the photo editing application to upload any number of photographic images to the network sales server 220 and order processing server 222, so that the photographic images may be reprinted as high quality images by the photofinishing lab 230 or printed on a number of objects by third party fulfillment houses 240. The NAP module 216 described above facilitates the transfer between the computer 210 and the network sales server 220 and order processing server 222. In one embodiment, the NAP module 216 is a plug-in module.

The NAP module 216 includes functionality which permits photographic images stored in the file system 212 of the computer 210 and edited by the photo editing application 214 to be transferred to the network sales server 220 and the order processing server 222. In one embodiment, this transfer is conducted over the internet. The NAP module 216 accomplishes this transfer by launching an application.

In the present invention, the NAP module 216 launches a conventional Web browser which allows the consumer 1 to directly interact with the network sales server 220 to view the products and prices and to place the order by specifying the desired information, namely quantities, products, sizes, etc., of the desired products, before any of the images are uploaded by the NAP module 216.

By waiting until the order is complete, before uploading the digital images, the NAP module 216 increases the speed of the ordering process. The NAP module 216 achieves this goal by maintaining the images to be uploaded on the memory at the computer 210, until the order is complete.

As long as an order is open, the NAP module 216 provides the consumer 1 with an indication that reminds the consumer 1 of the open order. When the consumer 1 chooses to pass one of the stored or edited images, edited with the photo editing application 214, the desired image data is passed to the NAP module 216. When the consumer 1 is interacting with the network sales server module 220, the NAP module 216 passes the image information to the server module 220 which checks the image information for possible less-than-optimum quality reprints, due to resizing and cropping, and outputs an error message to the consumer 1 if necessary.

When the consumer 1 indicates that he/she is finished with the order, the NAP module 216 notifies the photo editing application 214 that an order has been placed, the desired image files are uploaded to the network sales server 220 and/or order processing server 222, and an internet file upload application is launched.

If the consumer 1 attempts to close the photo editing application 214 with an order outstanding, the NAP module 216 issues a warning message displayed to inform the consumer 1 of the outstanding order and to query the consumer 1 about completing the order process.

The NAP module 216 also facilitates the download of any of a number of images from the network sales server 220 and/or order processing server 222 so that the consumer 1 may manipulate the download of other images as desired, using the photo editing application 214. More particularly, the photo editing application 214 includes a function which permits the consumer 1 to select a roll of pictures, stored for example, on one of the conventional on-line photo services. The consumer 1 must first connect to the internet and then enter a roll ID and password. The on-line photo service will then download the desired images and the consumer 1 will be able to select multiple or single frames and download the desired images to a film strip within the photo editing application 214.

Figure 3:
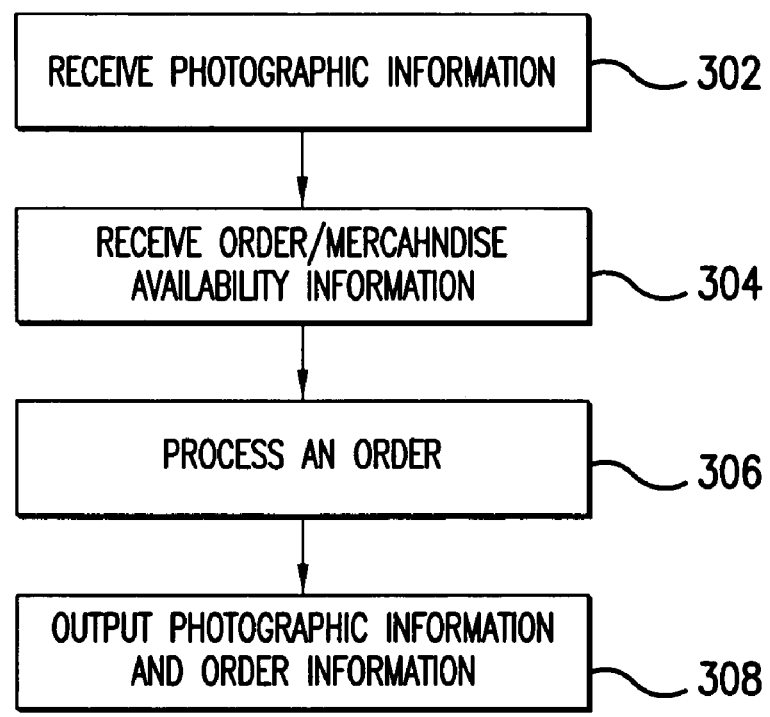
FIG. 3 illustrates a flowchart of the present invention in one exemplary embodiment.

FIG. 3 is a flowchart which illustrates the operation of the NAP module 216 in more detail. In Step 302, the NAP module 216 receives digital information, representing a photographic image, from one or more of a consumer photo editing application 214, a DSC/Scanner interface application 218 and a shell extension 219. In Step 304, the NAP 216 receives order and merchandise availability information from an external network entity, such as the network sales server 220. In Step 306, the NAP module 216 processes the order based on the photographic information received in Step 302 and the order/merchandise availability information received in Step 304. Finally, in Step 308, the NAP module 216 outputs or uploads the photographic information and the order information so that the network sales server 220, order processing server 222, photofinishing lab 230 and/or the third party fulfillment house 240 can provide a user with photographic images and/or merchandise with the photographic images imprinted thereon. Examples of these products include photographic reprints and enlargements, such as 4×6, 5×7, 8×10, package prints and template prints; compact discs (CDs) (or other computer media with photos stored thereon), photographic gifts, such as t-shirts, mugs, tote bags, mousepads, keychains, teddy bears, puzzles, and plates with photographic images printed thereon.

Figure 4A:
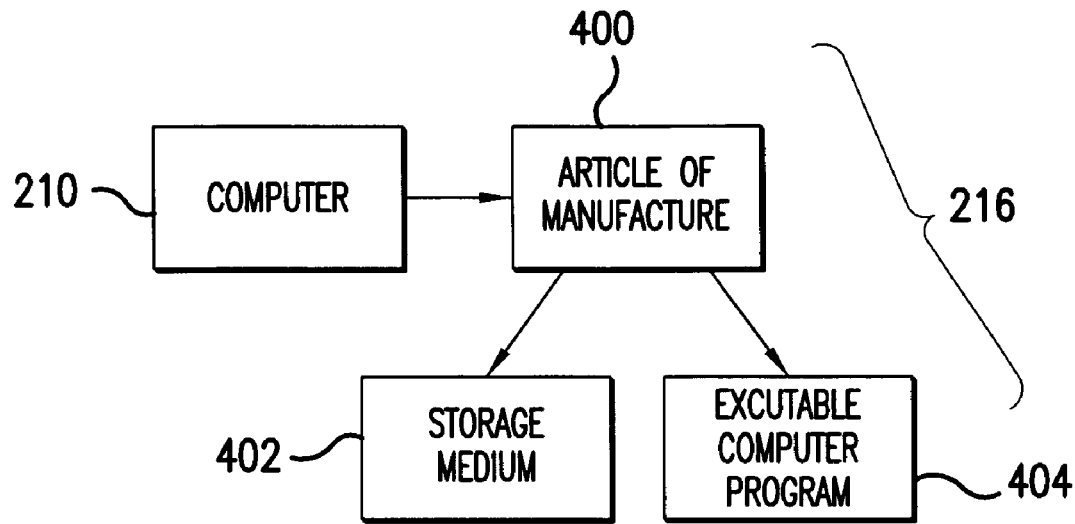
FIGS. 4a and 4b illustrate two exemplary embodiments of the network access protocol of (NAP) module of the present invention.
Figure 4B:
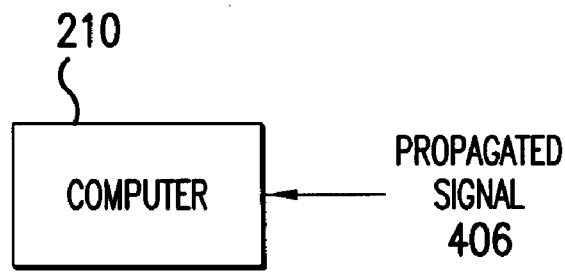

FIG. 4a illustrates the NAP module 216 in one embodiment of the present invention. The NAP module 216 is executable on the computer 210. The NAP module 216 may be constituted by an article of manufacture 400 which includes a storage medium 402 and a executable computer program 404. In another embodiment, as illustrated in FIG. 4b, the NAP module 216 is constituted by a propagated signal 406, which is downloaded into the computer 210.

The interaction between the NAP module 216 and the shell extension 219, which allows the consumer 1 to send pictures to be printed at a photofinishing lab 230 from the operating system (for example, the Windows File Explorer or the Windows "My Computer" window), will now be described in more detail. The three major entities in this transfer of information are the shell extension 219, the NAP module 216, and the photofinishing lab 230. Information is passed between NAP module 216 and the photofinishing lab 230 via the network sales server 220 and the order processing server 222. The shell extension 219 first queries the NAP module 216 regarding its status (busy uploading, ready, pending order) and checks for an internet connection. The shell extension 219 can call a help file that provides the consumer 1 with information regarding printing at the photofinishing lab 230 and a jump to a relevant URL. The shell extension 219 writes thumbnail images to designated locations and passes the locations to the NAP module 216. The shell extension 219 also bundles JPEG files of correct resolution and job number to a single ZIP file and passes that file to the NAP module 216. The shell extension 219 also allows the consumer 1 the opportunity, on start-up, to send any aborted order that is pending.

The NAP module 216 passes the thumbnail images and the resolution of the images (pixel width and pixel height) from the shell extension 219 to the photofinishing lab 230. The NAP module 216 passes from the network sales server 220 to the shell extension 219 the required files, the maximum resolution available for printing, and a job number. The NAP module 216 uploads the bundled files from the shell extension 219 to the network sales server 220. The NAP module 216 provides the consumer 1 an indication during upload of how long the upload will take (usually in minutes). The NAP module 216 also shows the consumer 1 a progress indicator during upload. If upload is interrupted, the NAP module 216 offers the user a resend option. Once uploading has been successfully completed, the NAP module 216 deletes the bundled file and displays (on a monitor of the computer 210) confirmation of a successful order. The NAP module 216 also performs administrative tasks, such as error checking and handling.

The network sales serve 220 displays a URL page which describes available services to the consumer 1. The network sales serve 220 also displays the thumbnail images as links during the ordering process. The network sales server 220 also provides an interface that assists the consumer 1 order merchandise for each uploaded picture and indicates the price information and relevant currency. The network sales server 220 displays messages on an order sheet that identifies low resolution images so the consumer 1 is aware of possible poor quality images, depending on a reprint size selected. The network sales server 220 sends the NAP module 216 a request for the requested JPEG files at their maximum resolution along with the job number. The network sales server 220 receives the uploaded bundled file and processes the bundled file into the order the consumer has placed. The network sales server 220 informs the NAP module 216 when the upload is complete. The network sales server 220 sends a confirmation once the job is processed and informs the NAP module 216 if the upload is not fully successful or was cancelled.

Figure 5:
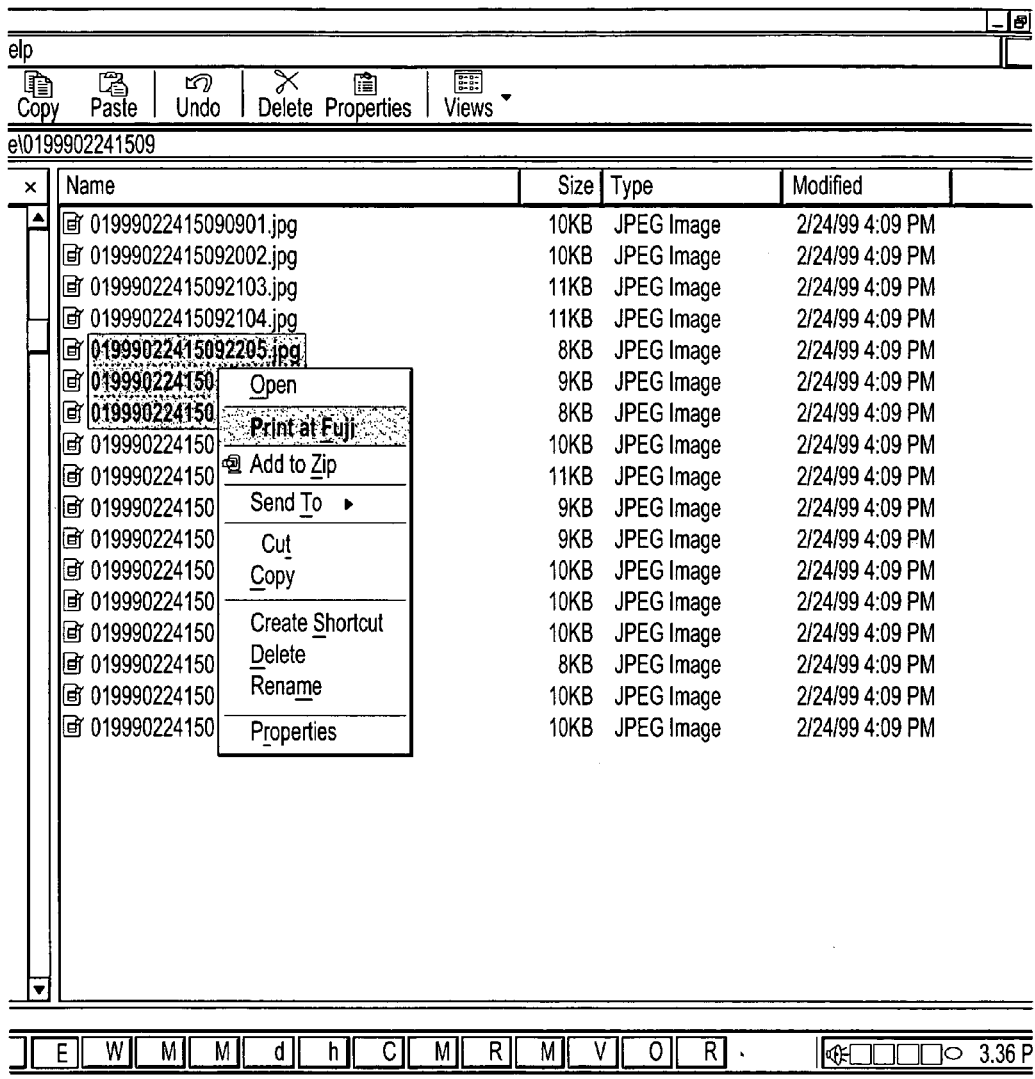
FIG. 5 illustrates an exemplary menu from which a print order is placed.

In order to start the above described transfer, the consumer 1 opens the "My Computer" window or Windows Explorer, right clicks on any image file to bring up the properties menu, and selects the print option, as illustrated in FIG. 5. The consumer 1 right clicks on one or more image files and chooses the print option, and the operating system launches the shell extension 219. The shell extension 219 creates JPEG thumbnail images and displays all the images. The consumer 1 selects the correct pictures to be uploaded. The consumer 1 clicks the print button as illustrated in FIG. 5. The shell extension 219 then calls the NAP module 216 and transfers pointers to the thumbnail image files and the current resolution of each thumbnail. The NAP module 216 calls the network sales server 220, identifies itself, and passes the pointers to the thumbnail images and the current resolution to the network sales server 220. The network sales server 220 requests the consumer to provide a shipping/billing address and billing information. When the consumer 1 "checks out", the network sales server 220 calls back to the NAP module 216 passing a job number and asking for all the pictures the consumer 1 placed orders and necessary resolution needed to fill the order. The shell extension 219 bundles into a ZIP file all the files requested at their maximum resolution in JPEG format, plus other information saved to the specified directory, and passes it to the NAP module 216. The NAP module 216 uploads the file to the network sales server 220. The network sales server 220, the order processing server 222, the photo finishing lab 230 and/or the third party fulfillment house 240 process the order and the consumer 1 receives the desired photographs and/or merchandise via other means. The network sales server 220 also sends a confirmation to the consumer 1.

The interaction between the NAP module 216 and the DSC/scanner interface application 218 will now be described in more detail. With respect to the above description of the shell extension 219, the DSC/scanner interface application 218 performs functions similar to the shell extension 219 described above. The NAP module 216 and network sales server 220 operate substantially as described above. The actual ordering process utilizing the DSC/scanner interface application 218 will now be described.

The consumer 1 connects the DSC/scanner 250 to a serial port of the computer 210 using a connector provided by the DSC manufacture or inserts a DSC removable image storage medium into a reader attached to the computer 210. The consumer 1 launches the DSC/scanner interface application 218 on the computer 210. The consumer 1 chooses a menu option to "Acquire" images from the DSC/scanner 250. The DSC/scanner interface application 218 displays thumbnail images from the DSC/scanner 250 in an application window of the DSC/scanner interface application 218. The consumer 1 selects the images to be printed from a display of thumbnail images and the consumer 1 clicks the print option. The DSC/scanner interface application 218 calls the NAP module 216 and sends pointers to thumbnail files in the current resolution of each. The remainder of the operation proceeds as discussed above with respect to the shell extension 219.

The interaction between the consumer photo editing application 214 and the NAP module 216 will now be described. The consumer photo editing application 214 performs functions similar to those described above with respect to the shell extension 219 and DSC/scanner interface application 218. The NAP module 216 and the network sales server 220 also performs similar functions. Within the consumer photo editing application 214, the consumer 1 chooses a print task. The consumer photo editing application 214 illustrates a pane which offers information on the service and assists the consumer 1 in getting the correct pictures onto the film strip. The consumer 1 selects to which photofinishing lab 230 he/she would like the desired images sent. The consumer photo editing application 214 writes JPEG thumbnail images for all the pictures on the film strip, calls the NAP module 216 and sends it pointers to the thumbnail images and the correct resolution of each. The NAP module 216 calls the network sales server 220 and alerts it that a consumer photo editing application 214 will be passing information and passes the pointers to the thumbnail files and their current resolution. The remainder of the process is the same as the examples above regarding the shell extension 219 and the DSC/scanner interface application 218.

Although the present invention has been described above in connection with specific embodiments, the present invention is not limited to the details of these embodiments. In particular, although FIG. 2 illustrates a network sales server 220, an order processing server 222, a photofinishing lab 230, and a third party fulfillment house 240, all of these elements and the functions performed may be replaced by a single entity, externally connected to the computer 210. Further, in connection with FIG. 3, although steps 304 and 306 have been described as being performed by the NAP module 216, in an alternate embodiment, these steps could be performed by the network sales server 220; the NAP module 216 launching a web browser which permits the consumer 1 to browse the order and merchandise information on the network sales server 220.

Further, although the computer 210 has been described operating on a Windows-based operating system and file system, any other commonly used operating system and file system could also be utilized. Further, although the invention as described above utilizes JPEG and ZIP files, any other commonly known file types could also be utilized.

The invention being thus described, it will be obvious that the same may be further varied in many ways. Such variations are not to be regarded as a departure from the spirit and scope of the invention, and all such modifications as would be obvious to one skilled in the art are intended to be included within the scope of the following claims.

What is claimed is:

1. A method of on-line ordering of image-related services, comprising:
   receiving, at a user station, a digital image;
   establishing a network connection between said user station and an external network entity;
   accessing an application at the external network entity through the network connection;
   exchanging ordering information, between said user station and said external network entity after accessing the application at the external network entity, for an image-related service for said digital image; and
   uploading said digital image to said external network entity or another external network entity subsequent to exchanging all ordering information.

2. The method of claim 1, wherein the digital image is a digital photographic image.

3. The method of claim 1, wherein the external network entity includes at least one of a server, photofinishing lab and third party fulfillment house.

4. The method of claim 1, wherein the image-related service generates at least one of photographs and merchandise with photographs imprinted thereon.

5. The method of claim 1, wherein
   said step of uploading delays uploading the digital image until an order for a plurality of digital images is complete.

6. The method of claim 1, further comprising:
   checking the digital image for image quality.

7. The method of claim 1, wherein
   said user station receives digital images from at least two of a plurality of different sources.

8. The method of claim 7, wherein the at least two of a plurality of different sources include a photo editing application, a digital device interface application, and a shell extension.

9. The method of claim 7, wherein the at least two of a plurality of different sources include a photo editing application, a digital device interface application, a shell extension, and the external network entity.

10. The method of claim 1, wherein
    said user station displays a locally stored thumbnail image corresponding to said digital image while said ordering information is exchanged between said user station and said external network entity.

11. The method of on-line ordering of image-related services as recited in claim 1, wherein the step of establishing a network connection between the user station and the external network entity further comprises:
    initiating an application at a network access protocol module through an extension to an operating system desktop shell interface.

12. The method of claim 11, wherein
    said user station receives said digital image using the shell extension of an operating system to access said digital image from a file system.

13. The method of on-line ordering of image-related services as recited in claim 1, wherein the digital image data may be received from at least one of a digital device interface applications program, a photo editing applications program, and the shell extension.

14. The method of on-line ordering of image-related services as recited in claim 1, wherein the step of exchanging ordering information further comprises:
    providing at least one pointer to a thumbnail file representing at least one of the images of the digital image data.

15. The method of on-line ordering of image-related services as recited in claim 1, wherein the step of exchanging ordering information further comprises:
    providing information related to the resolution of the digital image data.

16. A computer program embodied in a computer-readable medium for on-line ordering of image-related services, comprising:
    a receiving code segment for receiving, at a user station, a digital image;
    a network connection code segment for establishing a network connection between said user station and an external network entity;
    an accessing code segment for accessing an application at the external network entity through the network;
    an ordering code segment for exchanging ordering information, between said user station and said external network entity after accessing the application at the external network entity, for an image-related service for said digital image; and
    an uploading code segment for uploading said digital image to said external network entity or another external network entity subsequent to exchanging all ordering information.

17. The computer program of claim 16, wherein the digital image is a digital photographic image.

18. The computer program of claim 16, wherein the ordering information includes pricing and merchandise availability.

19. The computer program of claim 16, wherein the external network entity includes at least one of a server, photofinishing lab and third party fulfillment house.

20. The computer program of claim 16, wherein the image-related service generates at least one of photographs and merchandise with photographs imprinted thereon.

21. The computer program of claim 16, wherein the uploading code segment delays uploading the digital image until an order for a plurality of digital images is complete.

22. The computer program of claim 16, further comprising:
a checking code segment for checking the digital image for image quality.

23. The invention of claim 16, wherein
said user station receives digital images from at least two of a plurality of different sources.

24. The computer program of claim 23, wherein the at least two of a plurality of different sources include a photo editing application, a digital device interface application, and a shell extension.

25. The computer program of claim 23, wherein the at least two of a plurality of different sources include a photo editing application, a digital device interface application, a shell extension, and the external network entity.

26. The invention of claim 16, wherein said computer program embodied on said computer-readable medium further comprises:
a display code segment for displaying on said user station a locally stored thumbnail image corresponding to said digital image while said ordering information is exchanged between said user station and said external network entity.

27. The invention of claim 26, wherein said computer program embodied on said computer-readable medium further comprises:
a thumbnail image transmitting code segment for sending, to said external network, a pointer to said thumbnail image locally stored at said user station.

28. The invention of claim 16, wherein
said user station receives said digital image using a shell extension of an operating system to access said digital image from a file system.

29. The computer-program embodied in the computer-readable medium for on-line ordering of image-related services as recited in claim 16, wherein code segment for establishing a network connection between the user station and the external network entity further comprises:
an initiating code segment for initiating an application at a network access protocol module through an extension to an operating system desktop shell interface.

30. The computer-program embodied in the computer-readable medium for on-line ordering of image-related services as recited in claim 16, wherein the digital image data may be received from at least one of a digital device interface applications program, a photo editing applications program, and the shell extension.

31. The computer-program embodied in the computer-readable medium for on-line ordering of image-related services as recited in claim 16, wherein the code segment for exchanging ordering information further comprises:
a code segment for providing at least one pointer to a thumbnail file representing at least one of the images of the digital image data.

32. The computer program embodied in the computer-readable medium for on-line ordering of image-related services as recited in claim 16, wherein the code segment for exchanging ordering information further comprises:
a code segment for providing information related to the resolution of the digital image data.

33. A network photo print system, comprising:
a user station, capable of running
a camera/scanner applications program for supplying first image data to the user station,
a photo editing applications program for supplying second image data to the user station,
an operating system, including an operating system desktop shell interface and an extension to the operating system desktop shell interface, the shell extension supplying third image data to the user station, wherein the shell extension is capable of facilitating an order, and
a network access protocol module capable of receiving any one of the first, second, and third image data, receiving order and merchandise availability information from an external network entity; processing the order based on any one of the first, second, and third image data, and outputting any one the first, second, and third image data;
a network sales/order processing server for receiving the order and for receiving any one the first, second, and third image data image data from the user station after receiving the order; and
a photofinishing lab for producing photographic-quality prints images based on the order and any one the first, second, and third image data from the network sales/order processing server.

34. The network photo print system of claim 33, wherein said network access protocol module delays the outputting any one the first, second, and third image data to said network sales/order processing server until the order for a plurality of images is complete.

35. The network photo print system of claim 33, wherein the extension to the operating system desktop shell interface permits a user of the user station to initiate an order directly from a system file level of the operating system, without invoking an additional application program.

36. The network photo print system of claim 33, wherein said network access protocol module is a plug-in module.

37. The invention of claim 33, wherein said user station displays a locally stored thumbnail image corresponding to any one of the first, second, and third image data while sending ordering information to said network sales/order processing server.

38. The invention of claim 37, wherein said network access protocol module sends said network sales/order processing server a pointer to said thumbnail image locally stored at said user station.

* * * * *